United States Patent

Maroth

[15] 3,648,535
[45] Mar. 14, 1972

[54] ANTI-FRICTION SCREW AND NUT

[72] Inventor: Arthur M. Maroth, Grumman Hill Road, Wilton, Conn. 06897

[22] Filed: July 6, 1970

[21] Appl. No.: 52,617

[52] U.S. Cl..................................74/424.8, 74/459, 74/465
[51] Int. Cl....................F16h 1/18, F16h 55/22, F16h 55/06
[58] Field of Search..............74/465, 464, 459, 424.5, 424.8, 74/89.15

[56] References Cited

UNITED STATES PATENTS 2,319,063   5/1943   Hutchinson, Jr..................74/424.8 X

*Primary Examiner*—Leonard H. Gerin
*Attorney*—H. Gibner Lehmann

[57] ABSTRACT

An antifriction screw and nut construction wherein helical screw threads are engaged by antifriction mounted rollers carried by an annular nut body and extending radially inward into the bore of the nut body. Several embodiments of the invention are shown, directed to the object of preventing sliding friction between the roller surfaces and the engaged screw thread surfaces due to the distortions resulting from loading of the nut. In one embodiment the sidewalls of the screw thread are rounded or convex while the rollers have a straight taper, thereby to reduce the line area of contact and improve the frictional characteristics. In another embodiment of the invention the rollers are bulged or convex while the sidewalls of the threads are of flat characteristics to reduce sliding friction. In still another embodiment, the rollers have a straight taper and the thread walls a straight characteristic but the rollers are mounted intentionally with a slight misalignment which becomes remedied under normal loading to produce a true, nonsliding line contact with minimum friction. A novel screw construction comprises a double blunt thread having sloped, opposed helical faces the angles of which are related to the thread spacing and crest thickness.

12 Claims, 4 Drawing Figures

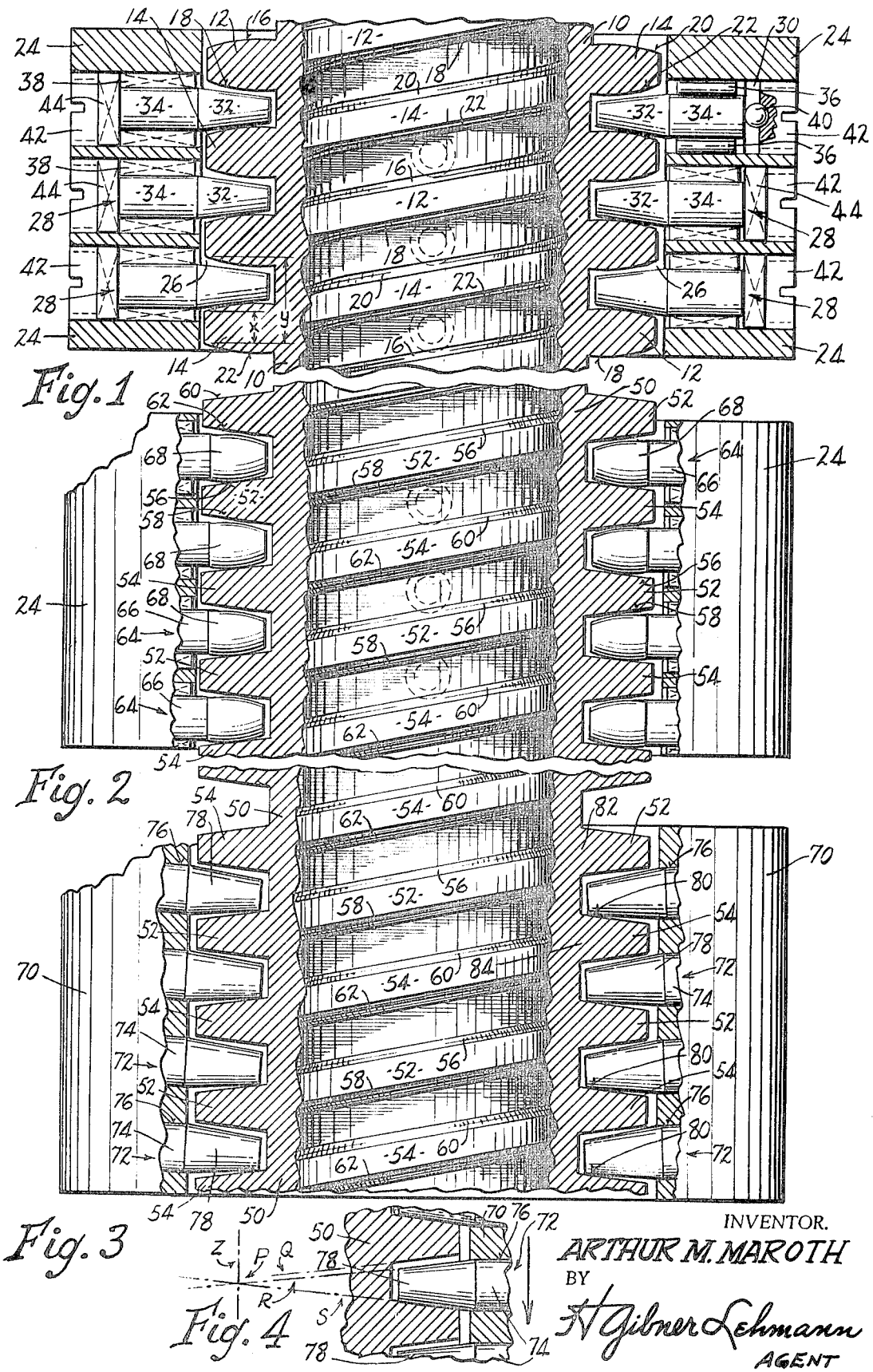

ANTI-FRICTION SCREW AND NUT

BACKGROUND

The present invention relates to species of an invention disclosed, described and claimed in my U.S. Pat. Nos. 3,296,880 and 3,308,674, dated respectively Jan. 10, 1967 and Mar. 14, 1967 and entitled "Radial Roller Antifriction Transmission" and "Radial Roller Antifriction Transmission".

In prior antifriction screw and nut constructions a high degree of efficiency and low amount of friction are had at light loads or no loads, by virtue of accurate parts and workmanship even through design could be faulty, or relationships improper. However, under heavy rated loading of the nut and screw parts increased sliding friction occurred, as well as a certain degree of elastic distortion which adversely affected the performance, the movement and relationship of the parts and greatly increased friction while at the same time materially reducing efficiency.

SUMMARY

The above disadvantages and drawbacks of prior antifriction screw and nut constructions are obviated by the present invention, which has for one of its objects the provision of an improved screw and nut structure wherein low friction and high efficiencies are obtained not only under light or no loads but also under heavy rated loads as well. This is accomplished by a novel thread and roller construction wherein there is provided a double thread screw with blunt threads which have sloped, opposed helical faces or walls related to thread thickness and spacing. At its maximum the spacing is preferably twice the thread crest thickness, and the face angles are such that convergence occurs at the screw axis, the entire assemblage being further so arranged that elastic distortions do not introduce excessively increased sliding frictions between the rollers and threads. In one embodiment the roller members are straight tapers and the thread walls are bulging or convex. In another embodiment the roller members are convex or rounded and the thread walls are of straight or flat characteristic. In still another embodiment the thread walls are of flat characteristic and the rollers are straight tapers but mounted slightly out of perfect alignment and in such manner that loading effects improved alignment, the full loading resulting in essentially perfect orientation of the parts so as to effect a straight line, non-slipping type of engagement. In each case the loading does not unduly adversely affect the frictional forces and high efficiencies. The screw part of the construction comprises a double helical thread carried by a shank portion, each of said threads being blunt or having flat crests, and having a generally tapered, truncated cross section. The widths of the crests of the threads are substantially half the widths of the grooves between the threads as measured at the thread crests, and the angularity between opposite thread walls is such that the convergence is effected essentially at the center or axis of the screw.

Other features and advantages of the invention reside in the provision of an improved antifriction screw and nut structure as above, which is especially simple in its construction, readily fabricated by conventional machining processes, easily adjusted for maximum efficiency, and rugged, effective and reliable in use.

Still other features and advantages will hereinafter appear.

In the drawings, showing several embodiments of the invention:

FIG. 1 is a fragmentary axial sectional view of an improved antifriction screw and nut construction as provided by the invention, wherein thread members have convex surfaces and roller members have straight tapers.

FIG. 2 is a fragmentary axial sectional view similar to that of FIG. 1, but illustrating another embodiment of the invention and comprising a construction with screw threads of flat or straight characteristic and rollers of bulging or convex configuration.

FIG. 3 is a fragmentary axial sectional view illustrating yet another embodiment of the invention, wherein the screw has thread elements of flat or straight-wall characteristic and wherein the roller elements have a straight taper configuration. The roller elements are shown as being in an exaggerated misalignment and the parts in a no-load condition.

FIG. 4 is a fragmentary sectional view of the screw and nut construction of FIG. 3, wherein the nut is under axial load or stress and the thread and roller elements thereof have elastically distorted so as to become perfectly oriented, thereby to effect a straight-line contact between the adjoining sidewall surfaces of the threads and the roller elements.

Referring first to FIG. 1, there is illustrated a screw 10 having a shank portion and a double helical thread comprising members 12, 14 with a cross sectional configuration as indicated, characterized by convex or rounded sidewall surfaces 16, 18 on the thread member 12, and rounded sidewall surfaces 20, 22 on the thread member 14.

The screw 10 in accordance with the present invention is further characterized by having each of the threads 12, 14 which are generally of tapered truncated cross section, related to the grooves between the threads whereby the widths "X" of the thread crests are substantially half the widths "Y" of the grooves between the threads as measured at the crests; this relationship assumes significance where the thread walls are not of a bulging nature but instead straight when viewed in section as in FIGS. 2 and 3. This point will be explained in detail below. That is, the dimension indicated at X in FIG. 1 is approximately half of the dimension indicated at Y in FIG. 1. I have found that such a relationship in conjunction with a screw having a double thread provides an especially advantageous arrangement well adapted for cooperation with antifriction roller elements of a nut structure, thereby to provide the least amount of sliding friction between the roller elements and sidewalls of the thread members and to provide the highest degree of efficiency.

Cooperable with the screw 10 is an annular nut member or structure 24 having a central bore 26 and having a plurality of roller members 28 carried in recesses 30 of the nut 24, the roller members comprising straight-taper thread-engaging portions 32 which are disposed in the bore 26 and extend radially inward in the nut 24. The roller members 28 have body or base portions 34 which are carried by antifriction roller elements 36 making up antifriction roller assemblages designated generally by the numeral 38.

The base portions 34 of the rollers 28 at their concealed ends engage antifriction roller elements 40 which are carried in sockets of adjusting screws 42 threaded into bores 30 of the nut 24. The antifriction balls 40 comprise thrust antifriction assemblages designated generally by the numeral 44, and may have a makeup other than the detailed showing of FIG. 1.

The nut 24 is shown as being arranged to have 12 of the roller members 28, disposed in sets of three located 90° apart about the circumference. However, a lesser or a greater number of such roller members may be provided, as will be understood.

Reference may be had to applicant's above-identified patents with respect to antifriction bearing and mounting assemblages for the roller members 28.

In FIG. 1 it will be noted that the straight-taper portions 32 of the rollers 28 do not have a straight line engagement with the thread members 12, 14 but instead engage the latter at localized areas on the convex sidewalls of the thread members. The no-load condition is illustrated in FIG. 1, and the engagement between the straight-taper portions 32 of the rollers 28 and the thread members 12, 14 is approximately midway between the crests and base portions of the thread members. If now an axial load is applied to the nut 24 in a downward direction, elastic distortion will occur not only of the thread members 12, 14 but also of the bearing assemblages 38, 44 and the roller members 28 themselves. As a consequence, the limited area of engagement between the straight-taper portions 32 of the roller members 28 will shift somewhat outward or radially away from the axis of the screw 10. However, the application of such load will not appreciably increase the area of contact between the straight-taper portions 32 of the rollers 28 and the convex sidewalls of the thread members 12, 14. Accordingly, the application of the load on the nut 24 will not result in any increase in sliding friction between the thread members and the roller members but only a displacement radially outward of the limited area of contact between the same. Therefore, no appreciable increase in sliding friction will occur, nor will there be any appreciable decrease in efficiency due to the loading of the screw and nut arrangement.

It will be understood that adjustment of the individual screws 42 can be made to shift the roller members 28 further inward or outward so that each assumes its share of the load imposed on the nut 24.

Another embodiment of the invention is illustrated in FIG. 2, wherein there is shown a double thread screw 50 having thread members 52, 54 whose sidewalls 56, 58 and 60, 62 are straight, measured on an axial section on the screw. Cooperable with the thread members 52, 54 is a nut body 24 having roller members 64 provided with shank or base portions 66 and with working or terminal portions 68 which are of bulbous, somewhat cone-like configuration. The inner terminal portions 68 engage the sidewalls of the screw threads 52, 54 approximately midway between the thread crests and the base portions thereof. As with the construction of FIG. 1, a limited area of contact exists between the roller portions 68 on the one hand and the sidewalls of the thread members 52, 54 on the other hand. As downward load is applied to the nut member 24 in FIG. 2, an elastic deformation of the thread members 52, 54 will occur as well as deformation of the bearing assemblages 38 and roller members 64. In consequence, the location of the area of contact between the roller members and the thread members will shift radially outward so as to be further from the axis of the screw 50. However, the size of the area of engagement between the roller members and the thread members will not appreciably increase, nor will there be any appreciable increase in the sliding friction between the thread and roller members as loading is applied to the nut body 24. In consequence, the high efficiency of the screw construction of FIG. 2 will not be appreciably impaired by the application of full load to the nut 24.

Still another embodiment of the invention is illustrated in FIGS. 3 and 4, wherein a screw 50 having thread members 52, 54 with sidewalls of straight configuration as measured on an axial section of the screw is cooperable with an annular nut body 70 carrying a plurality of roller members 72. The roller members 72 include antifriction assemblages 74 which are carried in bores 76 provided in the body 70. The roller members 72 have inner terminal or working portions 78 of straight-taper configuration, and the mounting of the roller members 72 is such that they are slanted downward as seen in FIG. 3 whereby only the inner-extremity or smallest-diameter portions 80 of the rollers engage the sidewalls of the screw members 52, 54 such engagement occurring in the base portions 82, 84 of the thread members. Thus, a limited area of contact exists between the roller members 72 and the thread members 52, 54. The misalignment or angularity of the roller members 72, shown as slanting downward in FIG. 3, is greatly exaggerated for purposes of illustration only. However, it should be understood that the misalignment or sloped mounting of the roller members 72 is much less than that shown, and that upon the application of a working load in a downward direction to the nut 70 the thread members 52, 54 will elastically deform as will also the antifriction mountings 74 and the rollers 72 whereby the straight-taper terminal portions 78 of the rollers will effect substantially a straight line contact with the sidewalls of the thread members 52, 54 as illustrated in FIG. 4. With such arrangement, there is no appreciable increase in sliding friction between the thread members and the roller members nor is there any appreciable loss of efficiency as a consequence of the application of full-rated load in an axial direction to the nut member 70.

In conjunction with the dimensional ratio of X to Y in FIG. 1, an important feature of the invention resides in a relationship between the apex point of the straight-taper roller portions 32 of FIG. 1 or 78 of FIG. 3, and the axis of the screw 50, or to put it another way, a relationship between the screw axis and the taper of the thread members 52, 54 taken with the dimension Y–X, this being illustrated in FIG. 4. Here the axis Z of the screw 50 is depicted as containing the point P at which the apex of the cone represented by the roller portion 78 becomes located. Also, except for the exaggeration of clearance incorporated in the drawing, the line Q representing the angularity of the thread wall would also virtually pass through the point P, meaning that the lines Q and R would virtually coincide. Only very little clearance is required between the surfaces represented by the lines Q and R, as for example a matter of thousands of an inch. This means that, for maximum performance in terms of low sliding friction and high efficiency, lines extended inward from the wall surfaces 62 and 56 in FIG. 2 would intersect at one point only on the axis of the screw 50, the same being true of the screw 50 of FIG. 3 and of course of the lines Q, R and S of FIG. 4, where R and S define the taper angle of the roller portion 78, and Q and S define the angularity of the thread member 72. One preferred embodiment of the invention is thus illustrated by FIGS. 3 and 4, but with clearances and angle mountings of the rollers greatly exaggerated for purposes of clarity of illustration. Preferably this condition is obtained exactly under conditions of loading, especially full loading, although it should be understood that the condition virtually exists for no-load operation of the screw and nut, inasmuch as the misalignment shown in exaggerated form in FIG. 3 actually is very much less than that seen in the illustration, so that coincidence of the screw axis and cone apex occurs virtually for various loads, and for no loading as well. By effecting such coincidence there is virtually eliminated sliding friction between the rollers and screw threads.

It will now be understood from the foregoing that I have provided a novel and improved antifriction screw and nut construction comprising a helical thread member and an annular nut having a roller member engageable with a sidewall of the thread member, such engagement being at a limited area of contact located a predetermined distance from the axis of the screw for no-load conditions of the parts. Upon the application of an axial load on the nut in one direction with respect to the screw there is effected an elastic distortion of the thread and roller members within the elastic limits thereof, and a shifting of said limited area of contact away from the screw axis without appreciable increase in sliding friction between the thread and roller elements, nor appreciable decrease of the efficiency of the screw and nut. The construction as illustrated is seen to be simple, easily manufactured by known fabricating techniques, especially sturdy and rugged, and capable of a high degree of efficiency.

Variations and modifications are possible without departing from the spirit of the invention.

I claim:

1. An antifriction screw and nut construction comprising, in combination:
   a. an elongate screw having a helical thread member,
   b. an annular nut having a central bore and a roller member disposed in the bore thereof and extending radially inward thereof,
   c. one of said members being arranged to engage the other member at a limited area of contact located a predetermined distance from the axis of the screw,
   d. the applying of an axial load on said nut in one direction with respect to the screw effecting an elastic distortion of the thread and roller members within the elastic limits thereof and shifting said limited area of contact away from the screw axis.

2. A screw and nut construction as in claim 1, wherein:
   a. the sidewall of the thread member is straight, measured on an axial section of the screw,
   b. said roller member comprising a cone, c. a tip portion of the roller member engaging a root portion of the thread member when the nut is unloaded,
d. said roller and thread members having a line contact upon the nut being loaded axially to effect a predetermined distortion of said members.

3. A screw and nut construction as in claim 1, wherein:
a. the sidewall of the thread member is convex, measured on an axial section of the screw,
b. said roller member comprising a cone,
c. an intermediate portion of the roller member engaging said thread member when the nut is unloaded,
d. a portion of the cone nearer the base thereof engaging the thread member upon the nut being loaded axially to effect a predetermined distortion of said members.

4. A screw and nut construction as in claim 1, wherein:
a. the sidewall of the thread member is straight, measured on an axial section of the screw,
b. said roller member having a bulbous, conelike configuration,
c. an intermediate portion of the roller member engaging said thread member when the nut is unloaded,
d. a portion of the roller member nearer the base thereof engaging the thread member upon the nut being loaded axially to effect a predetermined distortion of said members.

5. An antifriction screw and nut construction comprising, in combination:
a. a screw shank and a double helical thread on said shank, each of said threads having a generally tapered truncated cross section, the widths of the crests of the threads being substantially half the width of the grooves between the threads measured at the thread crests, and
b. an annular nut having a central bore through which the shank extends, and having a plurality of roller members disposed in the bore thereof and extending radially inward thereof, said roller members being arranged to engage said double helical thread at limited means of contact located predetermined distances from the axis of the helical thread,
c. elastic distortion of the roller members shifting said areas of contact away from said axis.

6. A screw and nut construction as in claim 5, wherein:
a. the cross-sectional shape of the thread cross sections is characterized by straight, convergent sides.

7. A screw and nut construction as in claim 5, wherein:
a. the cross-sectional shape of the thread cross sections is characterized by bulging convex sides.

8. An antifriction screw and nut construction as in claim 1, and further including:
a. antifriction rolling elements disposed between the roller member and the nut to reduce the frictional forces therebetween.

9. An antifriction screw and nut construction as in claim 1, and further including:
a. means for adjusting the rolling element axially inward and outward.

10. A screw and nut construction as in claim 2, wherein:
a. the point represented by the apex of the cone of the roller member lies essentially in the axis of the screw member.

11. A screw and nut construction as in claim 10, wherein:
a. the opposite sidewall of the thread member adjoining the first-mentioned thread member is straight, measured on an axial section of the screw,
b. the lines representing said sidewalls on said axial section being convergent and essentially intersecting the axis of the screw at a single point.

12. A screw construction as in claim 5, wherein:
a. lines representing opposite sloping sidewalls of adjoining threads as viewed on an axial section of the screw shank are convergent and essentially intersect the axis of the screw shank at a single point.

* * * * *